J. J. PENNINGTON.
Wagon-Gear and Brake.
No. 200,474.           Patented Feb. 19, 1878.
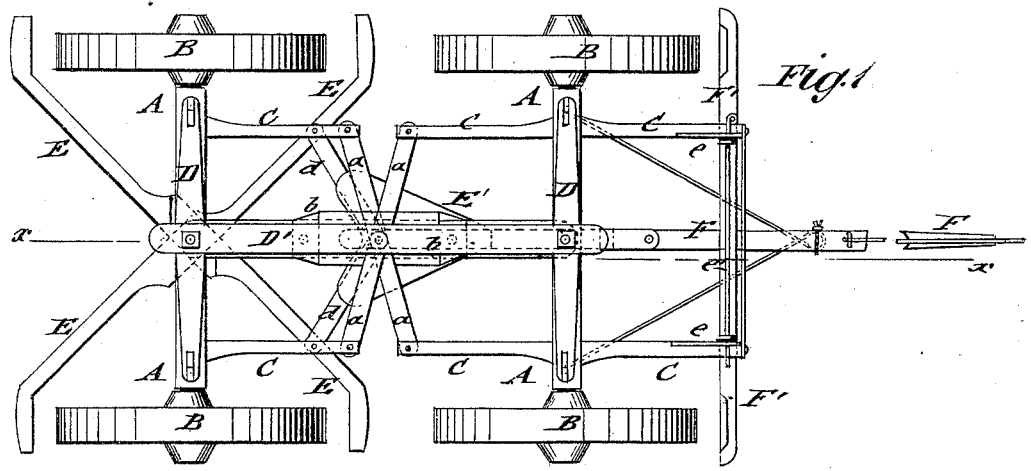
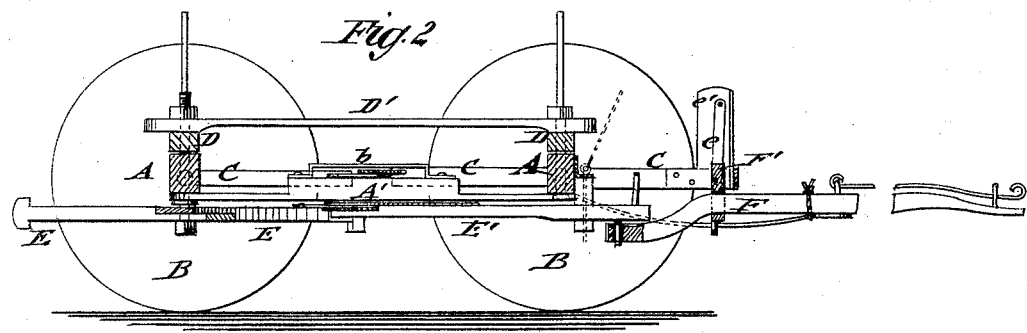
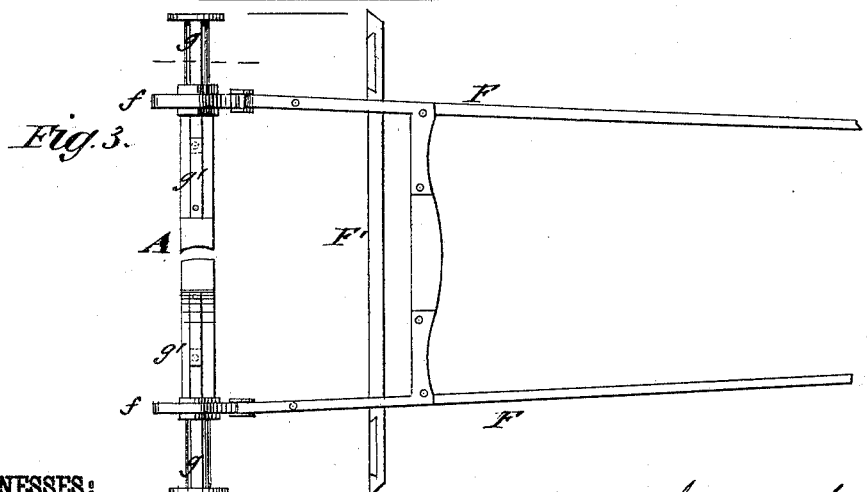
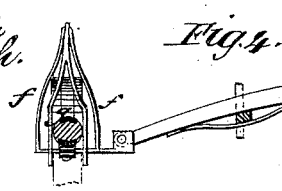
WITNESSES:
F. McArdle
J. H. Scarborough
Inventor
J. J. Pennington
By Munn & Co.
ATTORNEYS.

UNITED STATES PATENT OFFICE.

JAMES J. PENNINGTON, OF HENRYVILLE, TENNESSEE.

IMPROVEMENT IN WAGON GEAR AND BRAKE.

Specification forming part of Letters Patent No. 200,474, dated February 19, 1878; application filed September 29, 1877.

*To all whom it may concern:*

Be it known that I, JAMES JACKSON PENNINGTON, of Henryville, in the county of Lawrence and State of Tennessee, have invented a new and Improved Wagon Gear and Brake, of which the following is a specification:

In the accompanying drawing, Figure 1 represents a top view of my improved wagon gear and brake; Fig. 2, a vertical longitudinal section of the same on line $x\ x$, Fig. 1. Figs. 3 and 4 are, respectively, a top view and sectional side view of swinging shafts and brake.

Similar letters of reference indicate corresponding parts.

The object of this invention is to furnish for vehicles an improved gear and brake arrangement, by which wheels of equal size may be used that follow each other in the same track, and the brakes be automatically applied to the hind wheels or all the wheels on descending ground.

The invention will first be described in connection with the drawing, and then pointed out in the claims.

In the drawing, A represents the axles of my improved vehicle, which are connected by a pivoted center reach, A'. The axles are of equal height, and supported on wheels B, of equal diameter, that revolve on suitable thimble-skeins at the ends of the axles. The uniform size of the wheels requires a uniform size of axles, and one kind of skeins only, so that the latter may be conveniently replaced. To the axles A are rigidly attached, at right angles thereto, parallel hounds C, which extend from the front axle forward and backward a certain length, and from the rear axle forward, the rear ends of the front hounds being coupled by pivot-bars $a$ to the front ends of the rear hounds, the bars $a$ crossing each other, and being guided in a keeper, $b$, of the reach. The width of the wheels is made twice the width of the common vehicle-wheels, and the hind wheels, by the coupling of the hounds, are coupled to run in the track of the front wheel, following closely the same, and clearing any object cleared by the front wheels. On the axles are supported the bolsters D, which turn on front and rear king-bolts, the bolsters being connected by a rigid center piece or spring, D'. The wagon bed or body is supported between stays of the bolsters, and is never touched by the wheels, requiring no rub-irons, and being not thrown out of place by the wheels. The hind brakes E are made double by extending the diagonally-fulcrumed brake-arms forward and back of the hind axle. The front arms are connected by pivot-links $d$ with a sliding and guided actuating-bar, E', that is coupled by a pin to the sliding wagon-tongue F, which is supported in the lateral front brake arm or lever F', that is hung by arms $e$ to a cross-rod, $e'$, of supports at the front ends of the hounds C of the front axle. The tongue F passes through a guide-recess of the brake-lever F', and is applied thereto by a fastening-pin.

The forward strain of the horses takes off the brakes from the wheels; the diagonal hind brakes by the action of the axle, connecting-rods, and links; the front brakes by the swinging support of the brake-arm. On descending ground the backing of the horses throws back the tongue and puts on the hind and front brakes, increasing the power of the brakes in proportion to the descent; the steeper the ground the greater will be the pressure of the brakes on the wheels.

When shafts are used they may be hung and guided by swinging bearers $f$, of triangular shape, on stays and bottom guides of the front bolsters, the front brake-lever F' being then rigidly attached to the shafts, and applied by the same on descending by the backward swinging of the triangular bearings, as shown in Figs. 3 and 4. The rear part of the swinging bearings is connected by a cross-bar or otherwise with the actuating center piece of the hind brakes, so as to apply them at the same time.

The wheels run on skeins $g$, that may be readily detached from the spindles, slipping by top and bottom parts in grooves of the spindles, and being locked by springs $g'$, with end catches entering holes of the skeins.

By removing the spring-catches the skeins may be slipped off by being taken hold of at the outer heads or nuts that hold the wheels, so that the wheel may then be greased and the skeins reinserted and locked in position by the springs, as before, as shown in Fig. 4.

A vehicle of the construction described, and with the double brake attachment, is fully within control, easily directed to any desired point, and more conveniently kept in repair, as there is a less number of parts, and a simpler general construction.

Having thus described my invention, I claim as new and desire to secure by Letters Patent—

1. The combination, with wheels of the same diameter, and axles connected by median-pivoted reach A', of the front and rear hounds C, connected by pivoted cross-rods $a$, and the bolsters D D, turning on king-bolts and connected by piece D', as and for the purpose described.

2. The combination of the double brakes E, having front arms, connected by pivot-links $d$ with the slide-bar E', the tongue F, and the suspended brake-lever F', as and for the purpose set forth.

3. The combination, with the sliding tongue or swinging shafts and intermediate actuating center piece, of front brakes applied to tongue or shafts, and fulcrumed diagonal hind brakes, substantially in the manner and for the purpose set forth.

JAMES JACKSON PENNINGTON.

Witnesses:
 HENRY NIXON,
 T. D. DEAVENPORT.